3,005,004
SULFAMOYLPHENYL ESTERS OF ORGANIC PHOSPHOROTHIOATES

Gerald Berkelhammer, South Norwalk, Conn., assignor to American Cyanamid Company, New York, N.Y., a corporation of Maine
No Drawing. Filed June 1, 1959, Ser. No. 817,080
8 Claims. (Cl. 260—461)

This invention relates to new organic compounds and more particularly is concerned with novel sulfamoylphenyl organic phosphorothioates which may be represented by the following general formula:

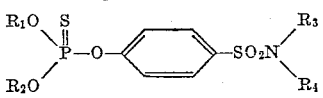

wherein $R_1$ and $R_2$ are lower alkyl radicals of from 1 to 4 carbon atoms and $R_3$ and $R_4$ are hydrogen or lower alkyl radicals of from 1 to 6 carbon atoms.

The new compounds may be prepared by reacting an appropriate phosphorochloridothioate, e.g., O,O-dimethyl phosphorochloridothioate with a suitable sulfonamide, e.g., p-hydroxybenzenesulfonamide under alkaline conditions in the presence of a suitable polar solvent, e.g., water, acetone, methyl ethyl ketone, etc. at temperatures ranging from about 0° C. to about 100° C.

The invention will be described in greater detail in conjunction with the following specific examples.

EXAMPLE 1

*O,O-diethyl O-p-sulfamoylphenyl phosphorothioate*

O,O-diethylphosphorochloridothioate (18.9 g., 0.1 mole) is added all at once to a stirred mixture of p-hydroxybenzenesulfonamide (17.3 g., 0.1 mole) and sodium carbonate (10.6 g., 0.1 mole) in 200 milliliters of methyl ethyl ketone. The reaction mixture is heated under reflux with stirring for three hours, then stirred at room temperature overnight. Filtration, followed by removal of the solvent under vacuum, leaves a red oil (16.4 g., 50.4%), $n_D^{25}$ 1.5346. Chromatographic purification using acid-washed activated alumina gives the analytically pure material.

EXAMPLE 2

*O,O-dimethyl O-p-sulfamoylphenyl phosphorothioate*

To a mixture of p-hydroxybenzenesulfonamide (17.3 g., 0.1 mole) and sodium carbonate (10.6 g., 0.1 mole) in 100 milliliters of methyl isobutyl ketone is added O,O-dimethyl phosphorochloridothioate (16.0 g., 0.1 mole) in one portion, with stirring. The reaction mixture is stirred at 60–65° for 6.5 hours and allowed to stand at room temperature overnight. The solids are removed by filtration and the filtrate washed with three 25-milliliter portions of 10% sodium carbonate solution and three 25-milliliter portions of saturated sodium chloride solution. Drying over magnesium sulfate, followed by removal of the solvent in vacuo, leaves a reddish orange oil (12.1 g., 41%). Chromatography on acid-washed alumina gives 9.9 g. of white solid, the purest fraction having M.P. 42.5–43°.

When this material is recrystallized from toluene, a crystalline modification melting at 70–71° is obtained having identical infrared spectrum and elementary analysis as the original compound.

EXAMPLE 3

*O,O-dimethyl O-p-sulfamoylphenyl phosphorothioate*

A mixture of p-hydroxybenzenesulfonamide (69.3 g., 0.4 mole), O,O-dimethyl phosphorochloridothioate (64.2 g., 0.4 mole), sodium hydroxide (32 g., 0.8 mole) and 700 milliliters of water are stirred for five and one-half hours at room temperature and then allowed to stand overnight. The reaction mixture is extracted with 300 milliliters of ether, the extracts dried over magnesium sulfate, and the solvent removed in vacuo. The residue is a light brown oil (47.8 g., 40%) which crystallizes on seeding. Two recrystallizations from toluene give ten crystals, M.P. 69–70°.

EXAMPLE 4

*O,O-dimethyl O-p-(isopropylsulfamoyl)phenyl phosphorothioate*

To a mixture of N-isopropyl-1-phenol-4-sulfonamide (5.4 g., 0.025 mole) and sodium hydroxide (1.0 g., 0.025 mole) in 75 milliliters of water are added separately and simultaneously O,O-dimethyl phosphorochloridothioate (4.0 g., 0.025 mole) and a solution of sodium hydroxide (1.0 g., 0.025 mole) in 50 milliliters of water. The mixture is stirred at room temperature for three and one-half hours and allowed to stand overnight. The reaction mixture is extracted with 125 milliliters of ether, the ethereal extracts dried over magnesium sulfate and the ether removed under reduced pressure yielding an oil (2.1 g., 24.5%). The oil is chromatographed on acid alumina adsorbent, yielding a colorless oil (1.8 g., 21%).

EXAMPLE 5

*O,O-diethyl O-p-(isopropylsulfamoyl)phenyl phosphorothioate*

The procedure of Example 4 is followed except that O,O-diethyl phosphorochloridothioate (4.7 g., 0.025 mole) is substituted for the corresponding dimethyl compound. After addition, the mixture is stirred at room temperature for two hours and fifty minutes and allowed to stand overnight. The reaction mixture is extracted with 210 milliliters of ether, the ethereal extracts dried over magnesium sulfate and the ether evaporated under reduced pressure, yielding a pale yellow oil (3.0 g., 33%). Chromatography of the oil on acid alumina adsorbent yields the product as an oil (1.3 g., 14%).

EXAMPLE 6

*O,O-dimethyl O-p-(dimethylsulfamoyl)phenyl phosphorothioate*

To a mixture of N,N-dimethyl-1-phenol-4-sulfonamide (5.0 g., 0.025 mole) and sodium hydroxide (1.0 g., 0.025 mole) in 50 milliliters of water are added separately and simultaneously O,O - dimethylphosphorochloridothioate (4.0 g., 0.025 mole) and a solution of sodium hydroxide (1.0 g., 0.025 mole) in 25 milliliters of water. The mixture is stirred at room temperature for three hours, extracted with ether, the ethereal extracts dried over magnesium sulfate and the ether removed under reduced pressure, yielding 3.8 g., (47%) of solid material. Recrystallization from toluene hexane yields the pure product, M.P. 52.5–53.5° C.

Other compounds of this invention may be made in similar fashion. Thus, for example, the reaction between O,O-dimethyl phosphorochloridothioate and N-methyl-1-phenol-4-sulfonamide gives O,O-dimethyl O-p-(methylsulfamoyl)phenyl phosphorothioate. Similarly, N-ethyl- and N-t-butyl-1-phenol-4-sulfonamide with O,O-dimethyl phosphorochloridothioate give the corresponding phosphorothioates, and O,O-diisopropyl phosphorochloridothioate with 1-phenol-4-sulfonamide gives O,O-diisopropyl O-p-sulfamoylphenyl phosphorothioate.

The compounds of the present invention are highly active insecticides either by contact or by systemic action. They may be used as sprays in organic solvents, as emulsions in water or other non-solvents, or on solid carriers such as talcs, clays, diatomaceous earths and the like. The insecticidal activity of the compounds of the present invention in controlling various insects is illustrated as follows:

*Nasturtium aphid.*—100% kill with the compounds of Examples 1 to 5, inclusive, at a concentration of 0.1% in a solvent carrier consisting of 65% acetone and 35% water. 100% kill with the compounds of Examples 2, 3 and 4 at a concentration of 0.01% in a solvent carrier consisting of 65% acetone and 35% water.

*German cockroach.*—95 to 100% kill with the compounds of Examples 1 to 5, inclusive, at a concentration of 1.0% on solid carriers such as fuller's earth and Attapulgus clay.

*Milkweed bug.*—60 to 100% kill with the compounds of Examples 1 to 5, inclusive, at a concentration of 1% on solid carriers such as pyrophyllite and Attapulgus clay.

*Southern armyworm.*—90 to 100% kill with the compounds of Examples 1 to 5, inclusive, at a concentration of 0.1% in a solvent carrier consisting of 65% acetone and 35% water.

The systemic activity of the compounds of the present invention is illustrated as follows:

Young Sieva Lima bean plants infested with two-spotted spider mites, *Tetranychus telarius*, are cut at ground level and inserted into an aqueous emulsion or solution of the test compound. The test is set up with ventilation in a manner to prevent toxic action by other than translocation, and counts are made after three days. The compounds of Examples 1, 2, 3 and 5 gave from 90 to 100% kill of the mites at a concentration of 100 p.p.m. in a solvent carrier consisting of 1 percent acetone and 99 percent water.

I claim:

1. A compound of the formula:

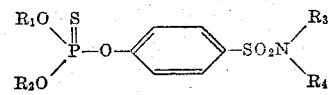

wherein $R_1$ and $R_2$ are lower alkyl radicals of from 1 to 4 carbon atoms and $R_3$ and $R_4$ are members of the group consisting of hydrogen and lower alkyl radicals.

2. O,O-diethyl O-p-sulfamoylphenyl phosphorothioate.

3. O,O-dimethyl O-p-sulfamoylphenyl phosphorothioate.

4. O,O-dimethyl O-p-(dimethylsulfamoyl)-phenyl phosphorodithioate.

5. The method of preparing a compound of the formula:

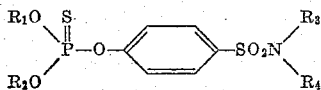

wherein $R_1$ and $R_2$ are lower alkyl radicals of from 1 to 4 carbon atoms and $R_3$ and $R_4$ are members of the group consisting of hydrogen and lower alkyl radicals which comprises reacting a di- lower alkyl phosphorochloridothioate with a member of the group consisting of p-hydroxybenzene-sulphonamide, N-isopropyl-1-phenol-4- sulfonamide and N,N-dimethyl-1-phenol-4-sulfonamide at a temperature of from 0° C. to 100° C., said reaction being conducted in an inert polar solvent and in the presence of an alkaline acid binding agent.

6. The method of preparing O,O-diethyl O-p-sulfamoylphenyl phosphorothioate which comprises reacting O,O-diethyl phosphorochloridothioate with p-hydroxybenzenesulfonamide at a temperature of from 0° C. to 100° C., said reaction being conducted in an inert polar solvent and in the presence of an alkaline acid binding agent.

7. The method of preparing O,O-dimethyl O-p-sulfamoylphenyl phosphorothioate which comprises reacting O,O-dimethyl phosphorochloridothioate with p-hydroxybenzenesulfonamide at a temperature of from 0° C. to 100° C., said reaction being conducted in an inert polar solvent and in the presence of an alkaline acid binding agent.

8. The method of preparing O,O-dimethyl O-p-(dimethylsulfamoyl)phenyl phosphorothioate which comprises reacting O,O-dimethyl phosphorochloridothioate with N,N-dimethyl-1-phenol-4-sulfonamide at a temperature of from 0° C. to 100° C., said reaction being conducted in an inert polar solvent and in the presence of an alkaline acid binding agent.

References Cited in the file of this patent

FOREIGN PATENTS 1,039,070    Germany _____ Sept. 18, 1958

UNITED STATES PATENT OFFICE
CERTIFICATION OF CORRECTION

Patent No. 3,005,004            October 17, 1961

Gerald Berkelhammer

It is hereby certified that error appears in the above numbered patent requiring correction and that the said Letters Patent should read as corrected below.

Column 4, lines 1 and 2, for "phosphorodithioate" read -- phosphorothioate --.

Signed and sealed this 24th day of April 1962.

(SEAL)
Attest:

ESTON G. JOHNSON
Attesting Officer

DAVID L. LADD
Commissioner of Patents